US012696158B2

(12) United States Patent
Chandrashekar et al.

(10) Patent No.: US 12,696,158 B2
(45) Date of Patent: Jul. 28, 2026

(54) BEAM SWITCHING CONTROLLED BY DISTRIBUTED UNIT

(71) Applicant: Nokia Solutions and Networks Oy, Espoo (FI)

(72) Inventors: Subramanya Chandrashekar, Bangalore (IN); Ingo Viering, Munich (DE); Richard Waldhauser, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 795 days.

(21) Appl. No.: 18/040,881

(22) PCT Filed: Aug. 11, 2021

(86) PCT No.: PCT/FI2021/050549
§ 371 (c)(1),
(2) Date: Feb. 7, 2023

(87) PCT Pub. No.: WO2022/038308
PCT Pub. Date: Feb. 24, 2022

(65) Prior Publication Data
US 2023/0308974 A1 Sep. 28, 2023

(30) Foreign Application Priority Data
Aug. 17, 2020 (FI) ..................................... 20205801

(51) Int. Cl.
*H04W 36/08* (2009.01)
*H04B 7/06* (2006.01)
*H04W 88/08* (2009.01)
(52) U.S. Cl.
CPC ...... *H04W 36/085* (2023.05); *H04B 7/06952* (2023.05); *H04W 36/087* (2023.05); *H04W 88/085* (2013.01)

(58) Field of Classification Search
CPC .. H04B 7/022; H04B 7/0695; H04B 7/06952; H04B 7/06954; H04B 7/06956;
(Continued)

(56) References Cited

U.S. PATENT DOCUMENTS

| | | | |
|---|---|---|---|
| 10,476,781 B2 | 11/2019 | Luo et al. | |
| 2017/0346545 A1 | 11/2017 | Islam et al. | |

(Continued)

FOREIGN PATENT DOCUMENTS

| | | |
|---|---|---|
| EP | 3261269 A1 | 12/2017 |
| WO | 2017/208071 A1 | 12/2017 |

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.

(Continued)

*Primary Examiner* — Ji-Hae Yea
(74) *Attorney, Agent, or Firm* — Carter, DeLuca & Farrell LLP

(57) ABSTRACT

Disclosed is a method comprising transmitting a beam switch request from a first distributed unit to a second distributed unit. The first distributed unit then receives a beam switch acknowledgment from the second distributed unit. The first distributed unit transmits a beam switch notification to a central unit, wherein the first distributed unit and the second distributed unit are at least partly controlled by the central unit. The first distributed unit further transmits a beam switch command to a terminal device.

8 Claims, 8 Drawing Sheets

(58) Field of Classification Search
CPC .............. H04B 7/06958; H04B 7/0696; H04B 7/06962; H04B 7/06964; H04B 7/06966; H04B 7/06968; H04W 36/085; H04W 36/087; H04W 88/085; H04W 92/20
See application file for complete search history.

(56) References Cited

U.S. PATENT DOCUMENTS

| | | | |
|---|---|---|---|
| 2018/0199328 | A1 | 7/2018 | Sang et al. |
| 2018/0279182 | A1* | 9/2018 | Sang ................... H04W 36/087 |
| 2018/0332520 | A1* | 11/2018 | Cheng ............... H04W 36/0016 |
| 2019/0104507 | A1 | 4/2019 | Majmundar et al. |
| 2019/0132778 | A1 | 5/2019 | Park et al. |
| 2019/0174346 | A1 | 6/2019 | Murray et al. |
| 2019/0222291 | A1 | 7/2019 | Wang et al. |
| 2019/0261234 | A1 | 8/2019 | Park et al. |
| 2019/0261344 | A1 | 8/2019 | Grant et al. |
| 2019/0319686 | A1 | 10/2019 | Chen, IV et al. |
| 2020/0162956 | A1 | 5/2020 | Cui et al. |

OTHER PUBLICATIONS

"3rd Generation Partnership Project; Technical Specification Group Radio Access Network; NG-RAN; Architecture description (Release 16)", 3GPP TS 38.401, V16.1.0 , Mar. 2020, pp. 1-50.

"3rd Generation Partnership Project; Technical Specification Group Radio Access Network; NR; Medium Access Control (MAC) protocol specification (Release 16)", 3GPP TS 38.321, V16.0.0, Mar. 2020, pp. 1-141.

"New WID: Further enhancements on MIMO for NR", 3GPP TSG RAN Meeting #86, RP-193133, Agenda: 9.1.1, Samsung, Dec. 9-12, 2019, 5 pages.

"Impacts on Radio Aggregation Scenarios due to CU-DU Separation", 3GPP TSG RAN WG3 Meeting#92, R3-161104, Agenda: 10.3.1, ZTE, May 23-27, 2016, pp. 1-3.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; NR; Requirements for support of radio resource management (Release 16)", 3GPP TS 38.133, V16.3.0, Mar. 2020, 1169 pages.

"Details on lower-layer mobility enhancements", 3GPP TSG-RAN WG1 Meeting #96, R1-1905162, Agenda: 7.2.12.2, Ericsson, Apr. 8-12, 2019, pp. 1-8.

"Views on beam-based mobility in NR", 3GPP TSG RAN WG1 Meeting #97, R1-1907543, Agenda: 7.2.12.2, Huawei, May 13-17, 2019, 4 pages.

"Beam level management <-> Cell level mobility", 3GPP TSG-RAN WG2 Meeting #93bis, R2-162210, Agenda: 9.6.3, Samsung, Apr. 11-15, 2016, 4 pages.

Office action received for corresponding Finnish Patent Application No. 20205801, dated Mar. 10, 2021, 7 pages.

Office action received for corresponding Finnish Patent Application No. 20205801, dated Aug. 20, 2021, 2 pages.

International Search Report and Written Opinion received for corresponding Patent Cooperation Treaty Application No. PCT/FI2021/050549, dated Nov. 26, 2021, 17 pages.

Extended European Search Report received for corresponding European Patent Application No. 21857822.7, dated Aug. 8, 2024, 10 pages.

* cited by examiner

| 501 | Transmit beam switch request to second DU |
| 502 | Receive beam switch acknowledgement from second DU |
| 503 | Transmit beam switch notification to CU |
| 504 | Transmit beam switch command to UE |

| 601 | Receive beam switch request from first DU |
| 602 | Reserve resources for UE |
| 603 | Transmit beam switch acknowledgement to first DU |

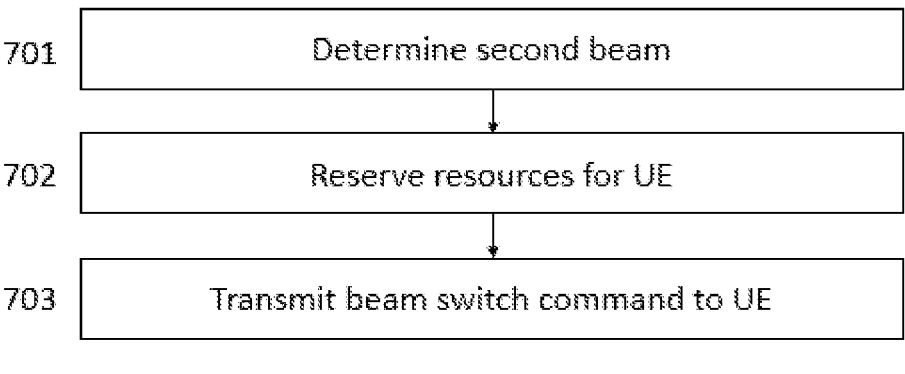
| 701 | Determine second beam |
| 702 | Reserve resources for UE |
| 703 | Transmit beam switch command to UE |
FIG. 7
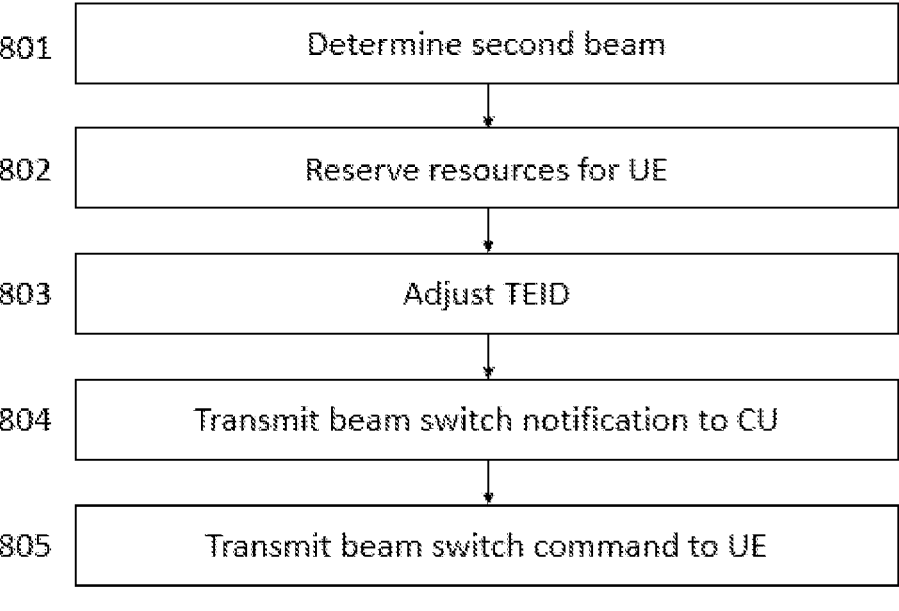
| 801 | Determine second beam |
| 802 | Reserve resources for UE |
| 803 | Adjust TEID |
| 804 | Transmit beam switch notification to CU |
| 805 | Transmit beam switch command to UE |
FIG. 8
| 901 | Receive information from CU |
| 902 | Identify second DU |
FIG. 9

1000

BEAM SWITCHING CONTROLLED BY DISTRIBUTED UNIT

RELATED APPLICATION

This application was originally filed as PCT Application No. PCT/FI2021/050549, filed on Aug. 11, 2021, which claims priority from FI Application No. 20205801, filed on Aug. 17, 2020, each of which is incorporated herein by reference in its entirety.

FIELD

The following exemplary embodiments relate to wireless communication.

BACKGROUND

As resources are limited, it is desirable to optimize the usage of network resources. A cell in a cellular communication network may be utilized such that better service may be provided to one or more terminal devices. The optimization of the usage of one or more cells may therefore enable better usage of resources and enhanced user experience to a user of a terminal device.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: transmit, by a first distributed unit comprised in the apparatus, a beam switch request to a second distributed unit, wherein the beam switch request indicates a request to reserve a first set of resources of the second distributed unit for a terminal device, and a request for transmitting a beam switch command from the second distributed unit to the first distributed unit, wherein the beam switch command comprises at least an indication to trigger switching the terminal device from a first beam to a second beam; receive, by the first distributed unit, a beam switch acknowledgment from the second distributed unit, wherein the beam switch acknowledgment comprises at least the beam switch command; transmit, by the first distributed unit, a beam switch notification to a central unit, wherein the beam switch notification indicates a preparation for switching the terminal device from the first beam to the second beam, and wherein the first distributed unit and the second distributed unit are at least partly controlled by the central unit; and transmit, by the first distributed unit, the beam switch command to the terminal device.

According to another aspect, there is provided an apparatus comprising means for transmitting, by a first distributed unit comprised in the apparatus, a beam switch request to a second distributed unit, wherein the beam switch request indicates a request to reserve a first set of resources of the second distributed unit for a terminal device, and a request for transmitting a beam switch command from the second distributed unit to the first distributed unit, wherein the beam switch command comprises at least an indication to trigger switching the terminal device from a first beam to a second beam; receiving, by the first distributed unit, a beam switch acknowledgment from the second distributed unit, wherein the beam switch acknowledgment comprises at least the beam switch command; transmitting, by the first distributed unit, a beam switch notification to a central unit, wherein the beam switch notification indicates a preparation for switching the terminal device from the first beam to the second beam, and wherein the first distributed unit and the second distributed unit are at least partly controlled by the central unit; and transmitting, by the first distributed unit, the beam switch command to the terminal device.

According to another aspect, there is provided an apparatus comprising at least one processor, and at least one memory including computer program code, wherein the at least one memory and the computer program code are configured, with the at least one processor, to cause the apparatus to: receive, by a second distributed unit comprised in the apparatus, a beam switch request from a first distributed unit, wherein the beam switch request indicates a request to reserve a first set of resources of the second distributed unit for a terminal device, and a request for transmitting a beam switch command from the second distributed unit to the first distributed unit, wherein the beam switch command comprises at least an indication to trigger switching the terminal device from a first beam to a second beam; reserve, by the second distributed unit, the first set of resources for the terminal device as indicated by the beam switch request; and transmit, by the second distributed unit, a beam switch acknowledgment to the first distributed unit, wherein the beam switch acknowledgment comprises at least the beam switch command.

According to another aspect, there is provided an apparatus comprising means for receiving, by a second distributed unit comprised in the apparatus, a beam switch request from a first distributed unit, wherein the beam switch request indicates a request to reserve a first set of resources of the second distributed unit for a terminal device, and a request for transmitting a beam switch command from the second distributed unit to the first distributed unit, wherein the beam switch command comprises at least an indication to trigger switching the terminal device from a first beam to a second beam; reserving, by the second distributed unit, the first set of resources for the terminal device as indicated by the beam switch request; and transmitting, by the second distributed unit, a beam switch acknowledgment to the first distributed unit, wherein the beam switch acknowledgment comprises at least the beam switch command.

According to another aspect, there is provided an apparatus comprising at least one processor, and at least one memory including computer program code, wherein the at least one memory and the computer program code are configured, with the at least one processor, to cause the apparatus to: determine, by a distributed unit comprised in the apparatus, a second beam based at least partly on one or more signal quality measurements; reserve resources of the distributed unit for switching a terminal device from a first beam to the second beam; and transmit a beam switch command from the distributed unit to the terminal device, wherein the beam switch command comprises at least an indication to trigger switching the terminal device from the first beam to the second beam, wherein the first beam and the second beam are associated with the distributed unit.

According to another aspect, there is provided an apparatus comprising means for determining, by a distributed unit comprised in the apparatus, a second beam based at least partly on one or more signal quality measurements; reserving resources of the distributed unit for switching a terminal device from a first beam to the second beam; and transmitting a beam switch command from the distributed unit to the terminal device, wherein the beam switch command comprises at least an indication to trigger switching the terminal device from the first beam to the second beam, wherein the first beam and the second beam are associated with the distributed unit.

According to another aspect, there is provided a system comprising at least a first distributed unit, a second distributed unit, a central unit and a terminal device; wherein the first distributed unit is configured to: transmit a beam switch request to the second distributed unit, wherein the beam switch request indicates a request to reserve a first set of resources of the second distributed unit for the terminal device, and a request for transmitting a beam switch command from the second distributed unit to the first distributed unit, wherein the beam switch command comprises at least an indication to trigger switching the terminal device from a first beam to a second beam; receive a beam switch acknowledgment from the second distributed unit, wherein the beam switch acknowledgment comprises at least the beam switch command; transmit a beam switch notification to the central unit, wherein the beam switch notification indicates a preparation for switching the terminal device from the first beam to the second beam, and wherein the first distributed unit and the second distributed unit are at least partly controlled by the central unit; and transmit the beam switch command to the terminal device; wherein the second distributed unit is configured to: receive the beam switch request from the first distributed unit; reserve the first set of resources for the terminal device as indicated by the beam switch request; and transmit the beam switch acknowledgement to the first distributed unit; wherein the central unit is configured to: receive the beam switch notification from the first distributed unit; and wherein the terminal device is configured to: receive the beam switch command from the first distributed unit; and execute the beam switch from the first beam to the second beam upon receiving the beam switch command.

According to another aspect, there is provided a system comprising at least a first distributed unit, a second distributed unit, a central unit and a terminal device; wherein the first distributed unit comprises means for: transmitting a beam switch request to the second distributed unit, wherein the beam switch request indicates a request to reserve a first set of resources of the second distributed unit for the terminal device, and a request for transmitting a beam switch command from the second distributed unit to the first distributed unit, wherein the beam switch command comprises at least an indication to trigger switching the terminal device from a first beam to a second beam; receiving a beam switch acknowledgment from the second distributed unit, wherein the beam switch acknowledgment comprises at least the beam switch command; transmitting a beam switch notification to a central unit, wherein the beam switch notification indicates a preparation for switching the terminal device from the first beam to the second beam, and wherein the first distributed unit and the second distributed unit are at least partly controlled by the central unit; and transmitting the beam switch command to the terminal device; wherein the second distributed unit comprises means for: receiving the beam switch request from the first distributed unit; reserving the first set of resources for the terminal device as indicated by the beam switch request; transmitting the beam switch acknowledgement to the first distributed unit; wherein the central unit comprises means for: receiving the beam switch notification from the first distributed unit; wherein the terminal device comprises means for: receiving the beam switch command from the first distributed unit; executing the beam switch from the first beam to the second beam upon receiving the beam switch command.

According to another aspect, there is provided a method comprising transmitting, by a first distributed unit, a beam switch request to a second distributed unit, wherein the beam switch request indicates a request to reserve a first set of resources of the second distributed unit for a terminal device, and a request for transmitting a beam switch command from the second distributed unit to the first distributed unit, wherein the beam switch command comprises at least an indication to trigger switching the terminal device from a first beam to a second beam; receiving, by the first distributed unit, a beam switch acknowledgment from the second distributed unit, wherein the beam switch acknowledgment comprises at least the beam switch command; transmitting, by the first distributed unit, a beam switch notification to a central unit, wherein the beam switch notification indicates a preparation for switching the terminal device from the first beam to the second beam, and wherein the first distributed unit and the second distributed unit are at least partly controlled by the central unit; and transmitting, by the first distributed unit, the beam switch command to the terminal device.

According to another aspect, there is provided a computer program comprising instructions for causing an apparatus to perform at least the following: transmit, by a first distributed unit, a beam switch request to a second distributed unit, wherein the beam switch request indicates a request to reserve a first set of resources of the second distributed unit for a terminal device, and a request for transmitting a beam switch command from the second distributed unit to the first distributed unit, wherein the beam switch command comprises at least an indication to trigger switching the terminal device from a first beam to a second beam; receive, by the first distributed unit, a beam switch acknowledgment from the second distributed unit, wherein the beam switch acknowledgment comprises at least the beam switch command; transmit, by the first distributed unit, a beam switch notification to a central unit, wherein the beam switch notification indicates a preparation for switching the terminal device from the first beam to the second beam, and wherein the first distributed unit and the second distributed unit are at least partly controlled by the central unit; and transmit, by the first distributed unit, the beam switch command to the terminal device.

According to another aspect, there is provided a computer readable medium comprising program instructions for causing an apparatus to perform at least the following: transmit, by a first distributed unit, a beam switch request to a second distributed unit, wherein the beam switch request indicates a request to reserve a first set of resources of the second distributed unit for a terminal device, and a request for transmitting a beam switch command from the second distributed unit to the first distributed unit, wherein the beam switch command comprises at least an indication to trigger switching the terminal device from a first beam to a second beam; receive, by the first distributed unit, a beam switch acknowledgment from the second distributed unit, wherein the beam switch acknowledgment comprises at least the beam switch command; transmit, by the first distributed unit, a beam switch notification to a central unit, wherein the beam switch notification indicates a preparation for switching the terminal device from the first beam to the second beam, and wherein the first distributed unit and the second distributed unit are at least partly controlled by the central unit; and transmit, by the first distributed unit, the beam switch command to the terminal device.

According to another aspect, there is provided a non-transitory computer readable medium comprising program instructions for causing an apparatus to perform at least the following: transmit, by a first distributed unit, a beam switch request to a second distributed unit, wherein the beam switch request indicates a request to reserve a first set of resources of the second distributed unit for a terminal device, and a request for transmitting a beam switch command from the second distributed unit to the first distributed unit, wherein the beam switch command comprises at least an indication to trigger switching the terminal device from a first beam to a second beam; receive, by the first distributed unit, a beam switch acknowledgment from the second distributed unit, wherein the beam switch acknowledgment comprises at least the beam switch command; transmit, by the first distributed unit, a beam switch notification to a central unit, wherein the beam switch notification indicates a preparation for switching the terminal device from the first beam to the second beam, and wherein the first distributed unit and the second distributed unit are at least partly controlled by the central unit; and transmit, by the first distributed unit, the beam switch command to the terminal device.

BRIEF DESCRIPTION OF THE DRAWINGS

In the following, various exemplary embodiments will be described in greater detail with reference to the accompanying drawings, in which

FIG. 5-9 illustrate flow charts according to some exemplary embodiments;

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, the substantially same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
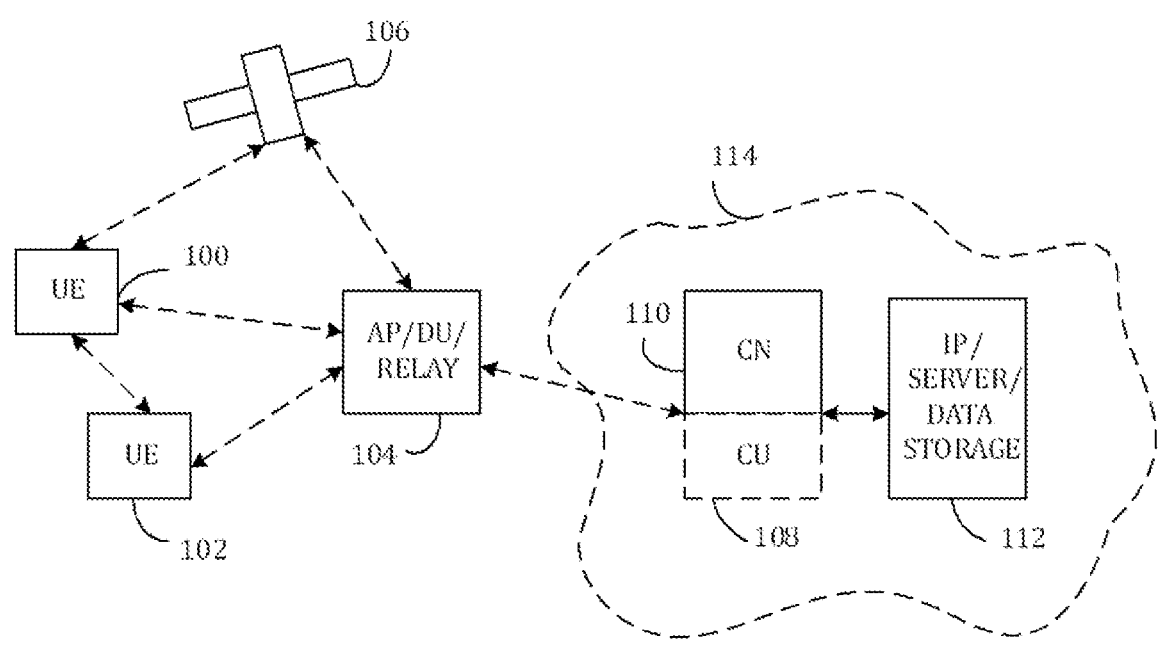
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network. FIG. 1 shows user devices 100 and 102 configured to be in a wireless connection on one or more communication channels in a cell with an access node (such as (e/g)NodeB) 104 providing the cell. The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The NodeB may also be referred to as a base station, an access point or any other type of interfacing device including a relay station capable of operating in a wireless environment. The (e/g) NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station.

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G may enable using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC).

5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It may also be possible that node operations will be distributed among a plurality of servers, nodes or hosts. Application of cloudRAN architecture may enable RAN real time functions being carried out at the RAN side (in a distributed unit, DU 104) and non-real time functions being carried out in a centralized manner (in a central unit, CU 108).

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home(e/g)nodeB. Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be needed to provide such a network structure.

For fulfilling the need for improving the deployment and performance of communication systems, the concept of "plug-and-play" (e/g)NodeBs may be introduced. A network which may be able to use "plug-and-play" (e/g)Node Bs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

A base station such as a gNB may comprise a central unit, CU, and one or more distributed units, DU. The CU may be connected to the one or more DUs for example by using an F1 interface. The CU may be defined as a logical node hosting higher layer protocols, such as radio resource control, RRC, service data adaptation protocol, SDAP, and/or packet data convergence protocol, PDCP, of the gNB. The DU may be defined as a logical node hosting radio link control, RLC, medium access control, MAC, and/or physical, PHY, layers of the gNB. The operation of the DU may be at least partly controlled by the CU. The DU may support one or more cells, but a cell may be supported by one DU.

The CU may comprise a control plane, CU-CP, which may be defined as a logical node hosting the RRC and the control plane part of the PDCP protocol of the CU for a gNB. The CU may further comprise a user plane, CU-UP, which may be defined as a logical node hosting the user plane part of the PDCP protocol and the SDAP protocol of the CU for a gNB.

Intra-DU, inter-DU and inter-gNB handovers may occur via layer 3, L3, i.e. RRC, and under control of the CU-CP due to the following reasons: 1) RRC and PDCP are hosted in CU-CP and CU-UP, as described above, 2) inter-DU and inter-gNB handovers may need handover preparation including admission control and user plane resource reservation at the identified target, 3) random-access channel, RACH, preambles may be reserved to enable contention free random access, CFRA, by a UE, and 4) RRC reconfiguration message encoding may only be done by CU-CP.

Figure 2:
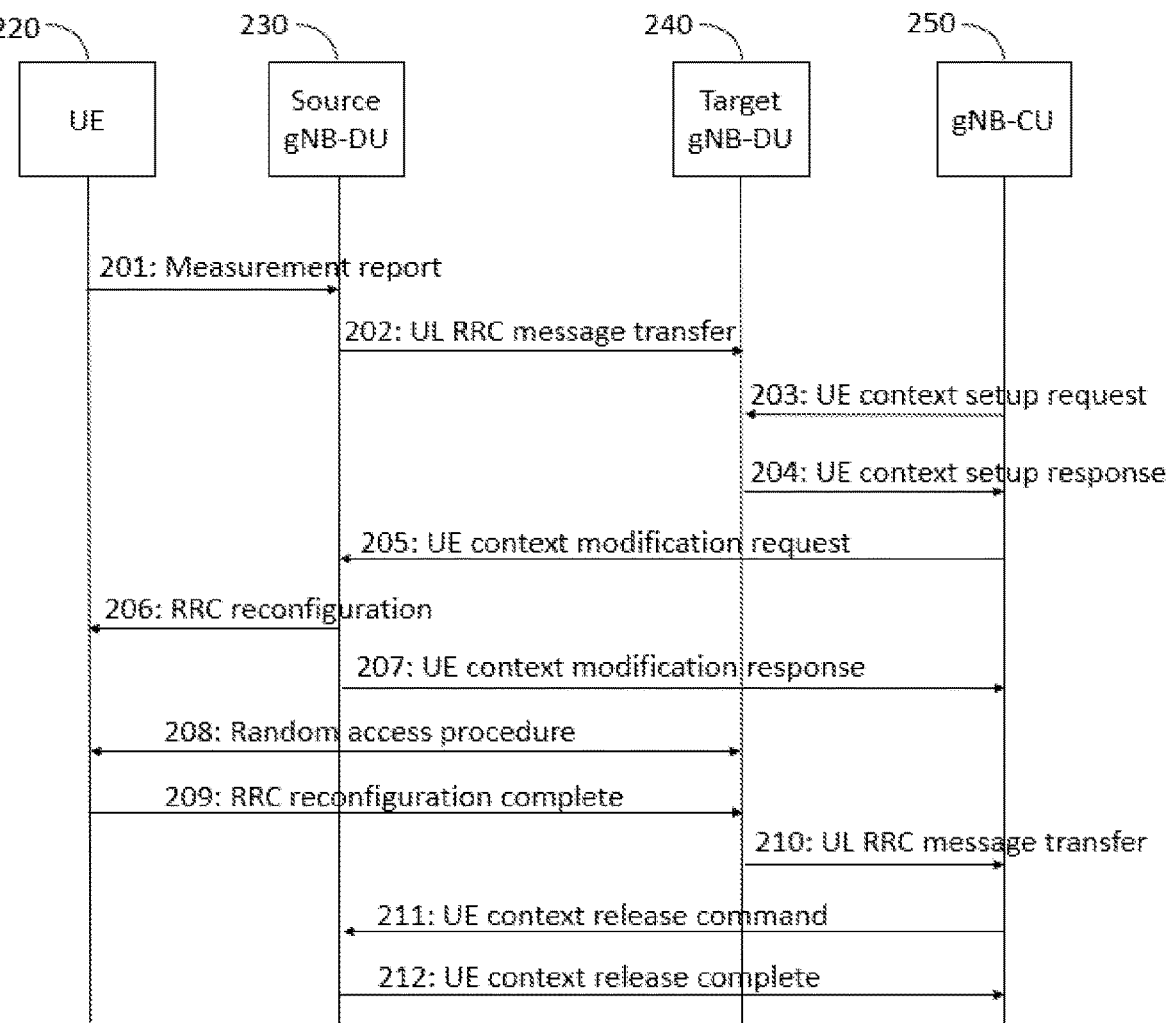
FIG. 2 illustrates a signalling diagram.

FIG. 2 illustrates a signalling diagram for inter-gNB-DU mobility signalling for intra-NR. A UE 220 transmits 201 a MeasurementReport message to a source gNB-DU 230. The source gNB-DU transmits 202 an UL RRC MESSAGE TRANSFER message to a gNB-CU 250 to convey the received MeasurementReport message. The gNB-CU transmits 203 an UE CONTEXT SETUP REQUEST message to a target gNB-DU 240 to create an UE context and setup one or more data bearers. The UE CONTEXT SETUP REQUEST message includes a HandoverPreparationInformation. The target gNB-DU responds to the gNB-CU by transmitting 204 an UE CONTEXT SETUP RESPONSE message. The gNB-CU transmits 205 a UE CONTEXT MODIFICATION REQUEST message to the source gNB-DU, which includes a generated RRCReconfiguration message and indicates to stop the data transmission for the UE. The source gNB-DU also sends a Downlink Data Delivery Status frame to inform the gNB-CU about the unsuccessfully transmitted downlink data to the UE. The source gNB-DU forwards 206 the received RRCReconfiguration message to the UE. The source gNB-DU responds to the gNB-CU by transmitting 207 the UE CONTEXT MODIFICATION RESPONSE message. A Random Access procedure is then performed at the target gNB-DU. The target gNB-DU transmits 208 a Downlink Data Delivery Status frame to inform the gNB-CU. Downlink packets, which may include PDCP protocol data units, PDUs, not successfully transmitted in the source gNB-DU, are transmitted from the gNB-CU to the target gNB-DU. It should be noted that it is up to gNB-CU implementation whether to start sending DL User Data to the gNB-DU before or after reception of the Downlink Data Delivery Status. The UE responds to the target gNB-DU by transmitting 209 an RRCReconfigurationComplete message. The target gNB-DU transmits 210 an UL RRC MESSAGE TRANSFER message to the gNB-CU to convey the received RRCReconfigurationComplete message. Downlink packets are transmitted to the UE. Also, uplink packets are transmitted from the UE, which are forwarded to the gNB-CU through the target gNB-DU. The gNB-CU transmits 211 an UE CONTEXT RELEASE COMMAND message to the source gNB-DU. The source gNB-DU releases the UE context and responds to the gNB-CU by transmitting 212 an UE CONTEXT RELEASE COMPLETE message.

Figure 3:
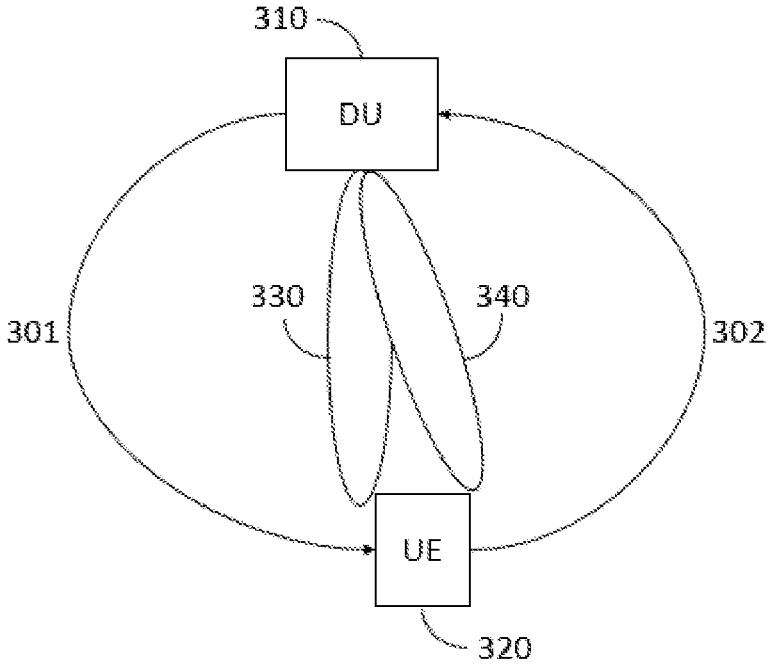
FIG. 3 illustrates beam switching.

Layer 2, L2, mobility within a cell may be realized by beam switching. FIG. 3 illustrates beam switching. Referring to FIG. 3, a gNB-DU 310 requests a synchronization signal block, SSB, beam switch execution for intra-NR-cell from a UE 320 by transmitting 301 a MAC control element, MAC-CE, comprising an indication to the UE to trigger switching from the source SSB beam 330 to the target SSB beam 340. The UE 320 then executes beam switching from the source SSB beam to the target SSB beam. The DU then receives 302 a hybrid automatic repeat request acknowledgement, HARQ ACK, from the UE for the target SSB beam indicating successful intra-NR-cell SSB beam switch execution.

The MAC entity may be configured by RRC per serving cell with a beam failure recovery procedure, which may be used for indicating to the serving gNB of a new SSB or channel state information reference signal, CSI-RS, when beam failure is detected on the serving SSB(s) or CSI-RS(s). Beam failure may be detected by counting the beam failure instance indication from the lower layers to the MAC entity. If beamFailureRecoveryConfig is reconfigured by upper layers during an ongoing random access procedure for beam failure recovery for SpCell, the MAC entity may stop the ongoing random access procedure and initiate a random access procedure using the new configuration.

As an alternative to the post-failure beam switching described above, the MAC in a gNB-DU may be configured to perform beam switching proactively based on the L1-RSRP measurement reports. The physical downlink control channel, PDCCH, and the physical downlink shared channel, PDSCH, may be beam-switched by using the MAC CE described in the following.

The network may activate and deactivate the configured transmission configuration indicator, TCI, states for PDSCH of a serving cell or a component carrier, CC, list by sending the TCI states activation/deactivation for UE-specific PDSCH MAC CE. The configured TCI states for PDSCH may be initially deactivated upon configuration and after a handover. If the MAC entity receives a TCI states activation/deactivation for UE-specific PDSCH MAC CE on a serving cell, the MAC entity shall indicate to lower layers the information regarding the TCI states activation/deactivation for UE-specific PDSCH MAC CE.

The network may indicate a TCI state for PDCCH reception for a CORESET of a serving cell or a CC list by sending a TCI state indication for UE-specific PDCCH MAC CE. If the MAC entity receives a TCI state indication for UE-specific PDCCH MAC CE on a serving cell, the MAC entity shall indicate to lower layers the information regarding the TCI state indication for UE-specific PDCCH MAC CE.

The TCI states activation/deactivation for UE-specific PDSCH MAC CE may be identified by a MAC subheader with a logical channel identifier, LCID. It may have a variable size comprising the following fields.

Serving cell ID: This field indicates the identity of the serving cell for which the MAC CE applies. The length of the field may be for example 5 bits. If the indicated serving cell is configured as part of a CC-list, this MAC CE may apply to some or all the CCs in the CC list.

BWP ID: This field indicates a downlink bandwidth part, BWP, for which the MAC CE applies as the codepoint of the downlink control information, DCI, bandwidth part indicator field. The length of the BWP ID field may be for example 2 bits. This field may be ignored if this MAC CE applies to a CC list.

$T_i$: If there is a TCI state with TCI-StateId i, this field indicates the activation/deactivation status of the TCI state with TCI-StateId i, otherwise the MAC entity shall ignore the $T_i$ field. The $T_i$ field may be set to 1 to indicate that the TCI state with TCI-StateId i shall be activated and mapped to the codepoint of the DCI Transmission Configuration Indication field. The $T_i$ field may be set to 0 to indicate that the TCI state with TCI-StateId i shall be deactivated and is not mapped to the codepoint of the DCI Transmission Configuration Indication field. The codepoint to which the TCI state is mapped may be determined by its ordinal position among some or all the TCI states with $T_i$ field set to 1, i.e. the first TCI state with $T_i$ field set to 1 shall be mapped to the codepoint value 0, second TCI state with $T_i$ field set to 1 shall be mapped to the codepoint value 1, and so on. The maximum number of activated TCI states may be for example 8.

CORESET Pool ID: This field indicates that mapping between the activated TCI states and the codepoint of the DCI Transmission Configuration Indication set by field $T_i$ is specific to the ControlResourceSetId configured with CORESET Pool ID. This field set to 1 indicates that this MAC CE shall be applied for the downlink transmission scheduled by CORESET with the CORESET pool ID equal to 1, otherwise, this MAC CE shall be applied for the downlink transmission scheduled by CORESET pool ID equal to 0.

Table 1 below illustrates TCI states activation/deactivation for UE-specific PDSCH MAC CE.

TABLE 1

| CORESET Pool ID | Serving cell ID | | | | | BWP ID | |
|---|---|---|---|---|---|---|---|
| $T_7$ | $T_6$ | $T_5$ | $T_4$ | $T_3$ | $T_2$ | $T_1$ | $T_0$ |
| $T_{15}$ | $T_{14}$ | $T_{13}$ | $T_{12}$ | $T_{11}$ | $T_{10}$ | $T_9$ | $T_8$ |
| | | | . . . | | | | |
| $T_{(N-2)*8+7}$ | $T_{(N-2)*8+6}$ | $T_{(N-2)*8+5}$ | $T_{(N-2)*8+4}$ | $T_{(N-2)*8+3}$ | $T_{(N-2)*8+2}$ | $T_{(N-2)*8+1}$ | $T_{(N-2)*8}$ |

The TCI State Indication for UE-specific PDCCH MAC CE may be identified by a MAC subheader with LCID. It may have a fixed size of for example 16 bits with the following fields.

Serving Cell ID: This field indicates the identity of the serving cell for which the MAC CE applies. The length of the field may be for example 5 bits. If the indicated serving cell is configured as part of a CC-list, this MAC CE may apply to some or all the CCs in the CC list.

CORESET ID: This field indicates a Control Resource Set identified with ControlResourceSetId, for which the TCI State is being indicated. In case the value of the field is 0, the field refers to the Control Resource Set configured by controlResourceSetZero. The length of the field may be for example 4 bits.

TCI State ID: This field indicates the TCI state identified by TCI-StateId applicable to the Control Resource Set identified by the CORESET ID field. If the field of CORESET ID is set to 0, this field indicates a TCI-StateId for a TCI state of the first 64 TCI-states configured by tci-States-ToAddModList and tci-States-ToReleaseList in the PDSCH-Config in the active BWP. If the field of CORESET ID is set to some other value than 0, this field indicates a TCI-StateId configured by tci-StatesPDCCH-ToAddList and tci-StatesPDCCH-ToReleaseList in the controlResourceSet identified by the indicated CORESET ID. The length of the field may be for example 7 bits.

Table 2 below illustrates TCI State Indication for UE-specific PDCCH MAC CE.

TABLE 2

| Serving Cell ID | CORESET ID |
|---|---|
| CORESET ID | TCI State ID |

L1-RSRP measurements may be delivered for example over an uplink physical uplink control channel, UL-PDCCH, and they may be multiplexed with CSI-RS reports as well. Exemplary bitwidths for CRI (CSI-RS Resource Indicator), SSBRI (SS/PBCH Resource Block Indicator), RSRP, and differential RSRP are specified in Table 3 below, where $$K_S^{SSB}$$

13 is the configured number of SS/PBCH blocks in the corresponding resource set for reporting ssb-Index-RSRP.

TABLE 3

| Field | Bitwidth |
|---|---|
| CRI | $[\log_2(K_S^{CSI\text{-}RS})]$ |
| SSBRI | $[\log_2(K_S^{SSB})]$ |
| RSRP | 7 |
| Differential RSRP | 4 |

Table 4 below specifies the mapping order of CSI fields of one report for CRI/RSRP or SSBRI/RSRP reporting.

TABLE 4

| CSI report number | CSI fields |
|---|---|
| CSI report #n | CRI or SSBRI #1 as in Table 3, if reported |
| | CRI or SSBRI #2 as in Table 3, if reported |

14

TABLE 4-continued

| CSI report number | CSI fields |
|---|---|
| | CRI or SSBRI #3 as in Table 3, if reported |
| | CRI or SSBRI #4 as in Table 3, if reported |
| | RSRP #1 as in Table 3, if reported |
| | Differential RSRP #2 as in Table 3, if reported |
| | Differential RSRP #3 as in Table 3, if reported |
| | Differential RSRP #4 as in Table 3, if reported |

CellGroupConfig is a nested information element, which may comprise the RLC, MAC and PHY layer parameters controlled by the DU. The CellGroupConfig information element may be used to configure a master cell group, MCG, or a secondary cell group, SCG. A cell group comprises a MAC entity, a set of logical channels with associated RLC entities, a primary cell, SpCell, and one or more secondary cells, SCells. The fields, i.e. parameters, that may be comprised in the CellGroupConfig information element are described in Table 5 below.

TABLE 5

| CellGroupConfig field descriptions | |
|---|---|
| bap-Address | Backhaul adaptation protocol, BAP, address of the node that is hosting this cell group. |
| bh-RLC-ChannelToAddModList | Configuration of the MAC Logical Channel, the corresponding backhaul RLC entities to be added and modified. |
| bh-RLC-ChannelToReleaseList | List of MAC Logical Channel, the corresponding backhaul RLC entities to be released. |
| mac-CellGroupConfig | MAC parameters applicable for the entire cell group. |
| rlc-BearerToAddModList | Configuration of the MAC Logical Channel, the corresponding RLC entities and association with radio bearers. |
| reportUplinkTxDirectCurrent | Enables reporting of uplink and supplementary uplink Direct Current location information upon BWP configuration and reconfiguration. This field is only present when the BWP configuration is modified or any serving cell is added or removed. This field is absent in the IE CellGroupConfig when provided as part of RRCSetup message. If UE is configured with supplementary uplink, SUL, carrier, UE reports both UL and SUL Direct Current locations. |
| rlmInSyncOutOfSyncThreshold | Block error rate, BLER, threshold pair index for in-sync, IS, and out-of-sync, OOS, indication generation. n1 corresponds to the value 1. When the field is absent, the UE applies the value 0. Whenever this is reconfigured, UE resets N310 and N311, and stops T310, if running. Network may not include this field. |
| sCellState | Indicates whether the SCell shall be considered to be in activated state upon SCell configuration. |
| sCellToAddModList | List of SCells to be added or modified. |
| sCellToReleaseList | List of SCells to be released. |
| simultaneousTCI-UpdateList, simultaneousTCI-UpdateListSecond | List of serving cells which can be updated simultaneously for TCI relation with a MAC CE. The simultaneousTCI-UpdateList and simultaneousTCI-Update ListSecond may not contain substantially the same serving cells. |
| simultaneousSpatial-UpdatedList, simultaneousSpatial-UpdatedListSecond | List of serving cells which can be updated simultaneously for spatial relation with a MAC CE. The simultaneousSpatial-UpdatedList and simultaneousSpatial-UpdatedList may not contain substantially the same serving cells. |

TABLE 5-continued

| CellGroupConfig field descriptions | |
| --- | --- |
| spCellConfig | Parameters for the SpCell of this cell group, i.e. primary cell, PCell, of MCG or primary secondary cell, PSCell, of SCG. |

For legacy L2 beam switching to work, the two beams or cells may be needed to look similar to the UE from an L3 point of view, i.e. there should be no changes to the RRC configuration except for the used beam. For example, the content of the physical broadcast channel, PBCH, and the physical layer cell ID, PCI, may be needed to remain unchanged. Hence, legacy beam switching may be limited to intra-cell use. In addition, L3 based mobility may be associated with a high signalling overhead, as there may be 12 messages that are exchanged in the message flow for inter-gNB-DU mobility as illustrated in FIG. 2.

Some exemplary embodiments may be used to perform inter-DU beam switching for L2 mobility, i.e. when the target beam belongs to a different DU than the source DU. In some exemplary embodiments, inter-cell mobility, i.e. a handover between two cells, may be performed without using the RRC protocol, i.e. without transmitting an RRC reconfiguration message to the UE. In other words, the inter-cell, or inter-DU, handover may be completed by using the parameters, for example CellGroupConfig, controlled by a gNB-DU without requiring modification to the resources of the CU-CP or CU-UP. In addition, the target cell may be prepared for the handover without involving the CU-CP, i.e. without extensive signalling over the F1 interface at the source DU and the F1 interface at the target DU. L2 mobility may be based on L1 reference signal received power, RSRP, measurement reports transmitted by the UE, and MAC CE commands transmitted from the gNB-DU to the UE. This may simplify requirements for L3 measurements. Thus, L3 and L1-RSRP measurements may be load-balanced to free up some air interface capacity as well.

In some exemplary embodiments, the information related to beams managed and controlled by a gNB-DU may be exchanged over the F1 interface with the gNB-CU-CP. The gNB-CU-CP may determine the neighbouring beams that are relevant for a given gNB-DU and share this information with the gNB-DU by using the F1 interface for example in a gNB-CU configuration update message. As a result, a given source gNB-DU may determine the target gNB-DU, which owns and controls the best beam as indicated by L1-RSRP measurements. This may also enable the source gNB-DU to identify the target gNB-DU to transmit an L2 mobility handover preparation request to, i.e. the beam switch request 404 illustrated in FIG. 4. For example, the source gNB-DU may identify the target gNB-DU based on beam IDs and their mapping to cell IDs or DU IDs, which may be comprised in the information provided by the CU to the source gNB-DU. The CU may share information to a plurality of DUs connected to the CU.

Figure 4:
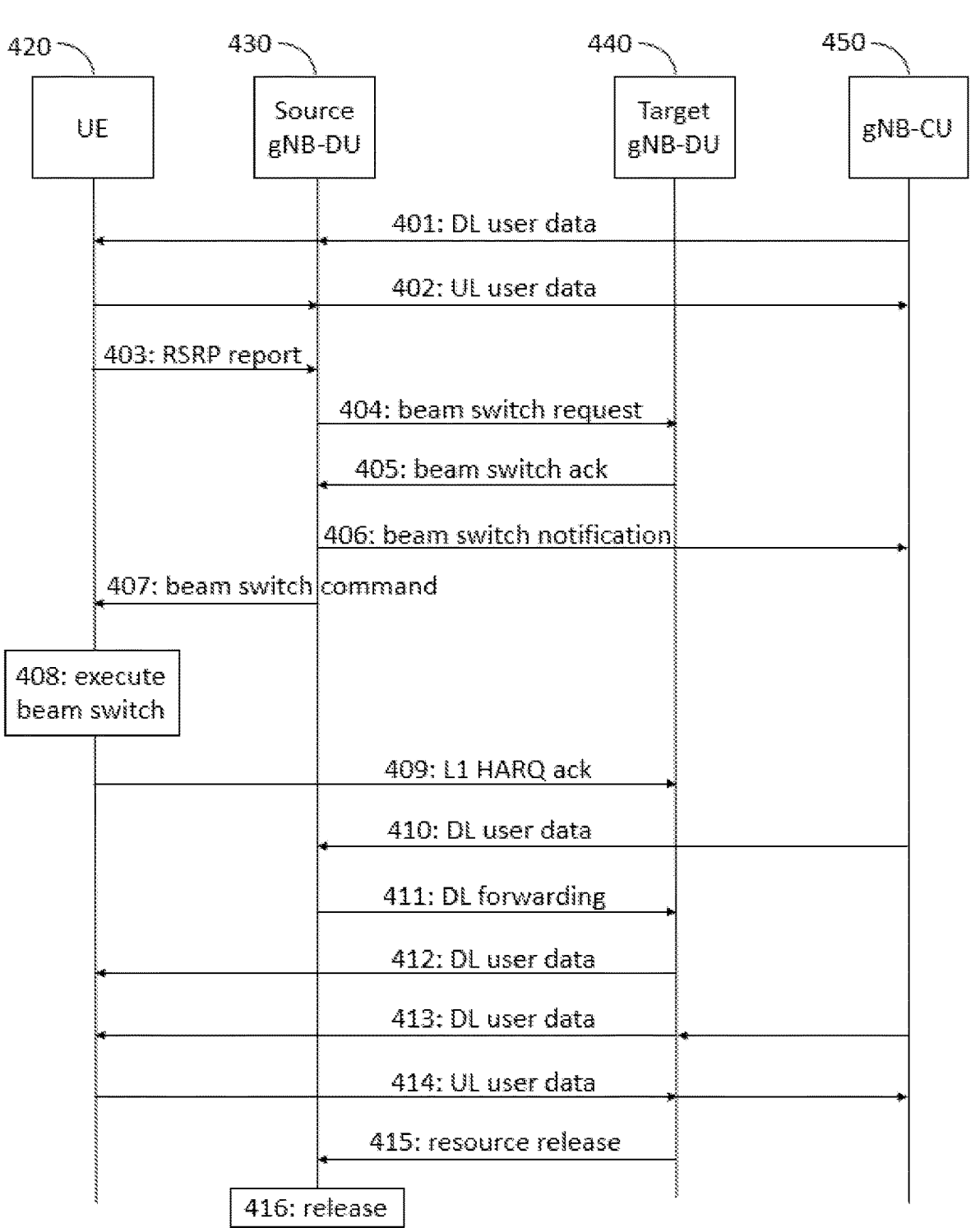
FIG. 4 illustrates a signalling diagram according to an exemplary embodiment.

FIG. 4 illustrates a signalling diagram according to an exemplary embodiment. In this exemplary embodiment, a UE 420 is served by a beam of a source gNB-DU 430, which is controlled by a gNB-CU 450. The source gNB-DU may also be referred to as a first distributed unit herein. In addition, a target gNB-DU 440 is controlled by the substantially same gNB-CU 450. The target gNB-DU may also be referred to as a second distributed unit herein. The gNB-CU, the source gNB-DU and the target gNB-DU may be comprised in a single gNB.

Referring to FIG. 4, downlink, DL, user data is transmitted 401 from the gNB-CU to the UE via the source gNB-DU, and uplink, UL, user data is transmitted 402 from the UE to the gNB-CU via the source gNB-DU.

Beam management reporting is performed in the physical layer, i.e. L1. Signal quality measurements such as L1 RSRP measurements of one or more beams, for example one or more beams having the highest measured RSRP, are reported 403 periodically from the UE to the source gNB-DU on the physical uplink control channel, PUCCH. The one or more beams may comprise beams of the serving cell and/or beams of a non-serving cell. If at least a subset of the reported one or more beams belong to a different cell than the serving cell, the source gNB-DU may decide to prepare a beam switch to the DU of the different cell, i.e. the target gNB-DU 440.

The communication between the DUs may be performed for example by using an application protocol, AP, between the logical entities, i.e. DUs. The communication may be exchanged over an interface, such as a Dn interface, between the DUs.

The source gNB-DU transmits 404 a first message, for example a DnAP message, indicating a beam switch request to the target gNB-DU. The first message may comprise the UE context stored in the source gNB-DU for that UE. The first message may comprise information such as the UL tunnel endpoint identifiers i.e TEIDs, of the CU-UP per dedicated radio bearer, DRB, and/or information on existing DRBs, for example slice IDs, for which resources may need to be reserved. The first message may also comprise information such as the L1 RSRP measurements in order to support the target gNB-DU with beam selection.

The target gNB-DU then transmits 405 a second message, for example a DnAP message, indicating a beam switch acknowledgement to the source gNB-DU. The second message may comprise for example an L2 MAC CE beam switch command and the details, i.e. the parameters controlled by a gNB-DU included in the nested parameter CellGroupConfig information element, of DRBs, which succeeded admission control, the DL TEIDs at the target gNB-DU, and/or the TEIDs for DL user data forwarding. In other words, information needed for the UE handover to target gNB-DU may be exchanged between the DUs via the transmissions 404, 405 without involving the gNB-CU.

The MAC CE used for the beam switch may involve TCI states activation/deactivation for UE-specific PDSCH MAC CE, which may be used for a beam switch of user-plane DRBs. The MAC CE used for the beam switch may also involve a TCI state indication for UE-specific PDCCH MAC CE, which may be used for a beam switch of the control plane.

Upon receiving the second message, the source gNB-DU transmits 406 to the gNB-CU a third message, for example an F1AP message, comprising an inter-DU beam switch notification. The beam switch notification indicates to the gNB-CU that a beam switch is being prepared. The third message may comprise for example the DL TEIDs at the target gNB-DU in order to enable data transmission in downlink and also prevent L3 mobility from competing with substantially the same resources. Furthermore, the source gNB-DU transmits 407 the L2 MAC CE beam switch command comprised in the second message to the UE. It should be appreciated that these two transmissions 406, 407 may also be performed in a different chronological order or simultaneously.

Upon receiving the L2 MAC CE beam switch command, the UE executes 408 the beam switching, and transmits 409 an L1 HARQ ACK to the target gNB-DU by using the new beam that it switched to. The L1 HARQ ACK indicates to the target gNB-DU that the UE has switched to the new beam and that DL user data may be transmitted to the UE.

Upon receiving the third message comprising the beam switch notification, the gNB-CU may transmit 410 DL user data to the target gNB-DU, for example to the received DL TEIDs at the target gNB-DU, via the source gNB-DU, which forwards 411 the DL user data from the gNB-CU to the target gNB-DU. In case a CP/UP split is applied for the CU, the gNB-CU-CP may provide the DL TEIDs of the target gNB-DU received from the source gNB-DU to the gNB-CU-UP for example by using an E1AP bearer context modification message. Upon receiving the forwarded DL user data, the target gNB-DU may then transmit 412 the DL user data to the UE.

As an alternative to steps 410-412, the gNB-CU may transmit 413 the DL user data to the UE via the target gNB-DU after adjusting the DL user path to the target gNB-DU.

In addition, UL user data received by the UE may be transmitted 414 from the UE to the gNB-CU via the target gNB-DU.

The target gNB-DU transmits 415 a fourth message, for example a DnAP message, to the source gNB-DU indicating resource release. In other words, the fourth message indicates successful completion of the beam switching requested by the source gNB-DU. Upon receiving the fourth message, the source gNB-DU releases 416 the resources reserved for the UE. The released resources may include the UE-specific radio resources allocated for the UE at the source gNB-DU. The parameters included in the CellGroupConfig are examples of resources that may be allocated and released by a DU for the UE.

In another exemplary embodiment, the roles of the source gNB-DU and the target gNB-DU may be assumed by a single gNB-DU, and thus the beam switch request 404, beam switch acknowledgement 405, DL forwarding 411 and resource release 415 messages may not be needed in this exemplary embodiment. This exemplary embodiment may be used for example for intra-DU inter-cell mobility. In this exemplary embodiment, a beam switch notification 406 may be optionally used, when the DL TEID is changed during intra-DU inter-cell mobility by the gNB-DU.

In a user plane related exemplary embodiment, inter-DU inter-cell beam switching may be performed without changing the security keys for the UE's DRBs, since the L2 mobility is internal to the gNB. The UE may change its gNB-DU, i.e. cell, but the serving gNB-CU-CP and gNB-CU-UP may remain substantially the same. As a result, a PDCP reset at the CU-UP may not be needed. However, an RLC re-establishment may be needed in this exemplary embodiment.

In another user plane related exemplary embodiment for inter-DU inter-cell beam switching, the source DU may transmit the last acknowledged PDCP service data unit, SDU, to the gNB-CU-UP over the F1 user plane interface, F1-U. This may provide a lossless handover.

In another user plane related exemplary embodiment, intra-DU inter-cell beam switching may be performed without changing the security keys of the UE's DRBs.

In another user plane related exemplary embodiment, intra-DU inter-cell beam switching may be performed without changing the RLC entity. Hence, RLC re-establishment may also be avoided.

In a control plane related exemplary embodiment, the beam switch command information may comprise L1 information such as a TCI state, subcarrier spacing, SCS, SSB information, BWP information, and/or L2 information. However, this may be a large amount of information for a MAC CE. In order to avoid including the whole set of handover command information in a MAC CE, a plurality of handover configurations, for example the most common handover configurations at the target beam, may be identified and a reference index may be assigned for each or at least one identified configuration. The MAC CE beam switch command may then comprise the index, which enables the UE to determine, or identify, the pre-defined configuration associated with that index, and to apply the pre-defined configuration to actuate a beam switch. Thus, the entire configuration is not needed to be transmitted in the MAC CE, but indicated by using the index instead. For example, indexes may be assigned for a plurality of Cell-GroupConfig configurations as follows: CellGroupConfig1: index 1, CellGroupConfig2: index 2, CellGroupConfig3: index 3, CellGroupConfig4: index 4, etc. The MAC CE may comprise for example the CellGroupConfig index that is shared by the target DU. If there are variations, they may be indicated by special parameters in the MAC CE. The special parameter may then override the index-based configuration. If the CellGroupConfig index cannot be assigned by the target DU, the inter-DU beam switch preparation may be rejected. The variations may refer to the changes to a particular index-based configuration. For example, the MAC CE may need to change the value of just one parameter compared to what is indicated by the index-based configuration.

In another control plane related exemplary embodiment, additional delta configurations may be transmitted, if the handover configuration is not exactly matching the configuration represented by the index, by using additional information elements as compared to the configuration indicated by the index. The delta configurations refer to the changes on top of the UE's existing configuration at the source gNB-DU.

Figure 5:
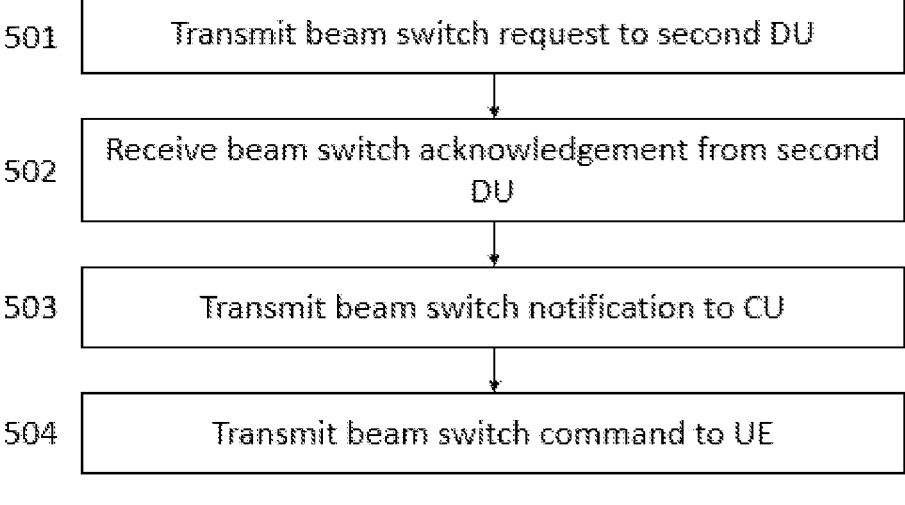

FIG. 5 illustrates a flow chart according to an exemplary embodiment for inter-DU mobility. A first distributed unit transmits 501 a beam switch request to a second distributed unit, wherein the beam switch request indicates a request to reserve a first set of resources of the second distributed unit for a terminal device, and a request for transmitting a beam switch command from the second distributed unit to the first distributed unit, wherein the beam switch command comprises at least an indication to trigger switching the terminal device from a first beam to a second beam. The first distributed unit then receives 502 a beam switch acknowledgment from the second distributed unit, wherein the beam switch acknowledgment comprises at least the beam switch command. The first distributed unit transmits 503 a beam switch notification to a central unit, wherein the beam switch notification indicates a preparation for switching the terminal device from the first beam to the second beam, and wherein the first distributed unit and the second distributed unit are at least partly controlled by the central unit. The first distributed unit transmits 504 the beam switch command to the terminal device. The first distributed unit, the second distributed unit and the central unit may be comprised in a single base station, such as a gNB.

Figure 6:
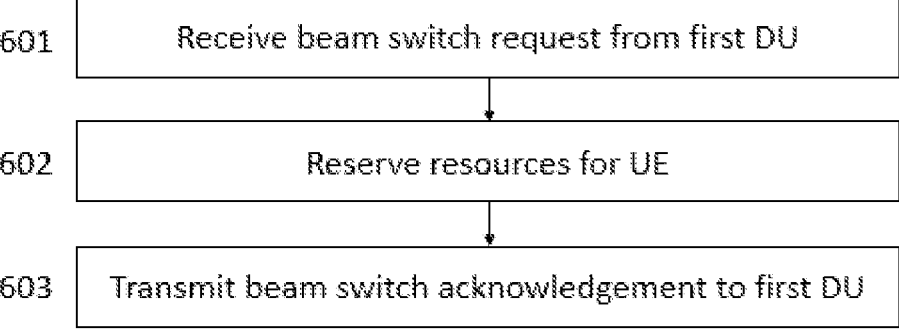

FIG. 6 illustrates a flow chart according to an exemplary embodiment for inter-DU mobility. A second distributed unit receives 601 a beam switch request from a first distributed unit, wherein the beam switch request indicates a request to reserve a first set of resources of the second distributed unit for a terminal device, and a request for transmitting a beam switch command from the second distributed unit to the first distributed unit, wherein the beam switch command comprises at least an indication to trigger switching the terminal device from a first beam to a second beam. The second distributed unit then reserves 602 the first set of resources for the terminal device as indicated by the beam switch request, and transmits 603 a beam switch acknowledgment to the first distributed unit, wherein the beam switch acknowledgment comprises at least the beam switch command. The first distributed unit, the second distributed unit and the central unit may be comprised in a single base station, such as a gNB.

FIG. 7 illustrates a flow chart according to an exemplary embodiment for intra-DU mobility. A distributed unit determines 701 a second beam for a terminal device to switch to based at least partly on one or more signal quality measurements. The one or more signal quality measurements may be, for example, received from the terminal device. The distributed unit then reserves 702 resources of the distributed unit for switching the terminal device from a first beam to the second beam. The distributed unit then transmits 703 a beam switch command from the distributed unit to the terminal device, wherein the beam switch command comprises at least an indication to trigger switching the terminal device from a first beam to the second beam, wherein the first beam and the second beam are associated with the distributed unit.

FIG. 8 illustrates a flow chart according to an exemplary embodiment for intra-DU mobility. A distributed unit determines 801 a second beam for a terminal device to switch to based at least partly on one or more signal quality measurements. The one or more signal quality measurements may be received, for example, from the terminal device or from a CU. The distributed unit then reserves 802 a set of resources of the distributed unit for switching the terminal device from a first beam to the second beam, wherein the first beam and the second beam are associated with the distributed unit. The distributed unit adjusts 803 one or more downlink tunnel endpoint identifiers of the distributed unit. The distributed unit transmits 804 a beam switch notification to a central unit, wherein the beam switch notification indicates a preparation for switching the terminal device from the first beam to the second beam. For example, the beam switch notification may be used to inform the central unit about the adjusted one or more downlink tunnel endpoint identifiers. The distributed unit transmits 805 a beam switch command to the terminal device, wherein the beam switch command comprises at least an indication to trigger switching the terminal device from the first beam to the second beam.

FIG. 9 illustrates a flow chart according to an exemplary embodiment for identifying a target DU. A first distributed unit receives 901 information associated with a second beam from a central unit, wherein the second beam is associated with a second distributed unit. The second beam may have a higher measured RSRP than a first beam associated with the first distributed unit. The first distributed unit then identifies 902 the second distributed unit based at least partly on the information associated with the second beam. The information may comprise, for example, a beam identifier and an associated cell identifier or DU identifier. The second distributed unit may be identified based on the cell identifier or DU identifier associated with the second distributed unit. After the second distributed unit, i.e. the target DU, is identified by the first distributed unit, i.e. the source DU, a handover may be performed to switch a terminal device from the first beam to the second beam as illustrated for example in FIGS. 4-6.

The functions and/or blocks described above by means of FIGS. 2 and 4-9 are in no absolute chronological order, and some of them may be performed simultaneously or in an order differing from the described one. Other functions and/or blocks may also be executed between them or within them.

A technical advantage provided by some exemplary embodiments may be that they may reduce signalling overhead. For example, in the exemplary embodiment illustrated in FIG. 4, three air interface messages 403, 407, 409 and four application protocol messages 404, 405, 406, 415 are transmitted, whereas 12 messages are transmitted in the message flow for inter-gNB-DU mobility illustrated in FIG. 2. In addition, the three air interface messages are light, i.e. L1 or L2, in comparison to RRC air interface messages. Furthermore, some exemplary embodiments may provide shorter mobility and increase robustness compared to legacy L3 mobility, for example. Some exemplary embodiments may also be used to perform L2 mobility for advanced mobility solutions, such as conditional handovers and dual active protocol stack, DAPS based handovers.

Figure 10:
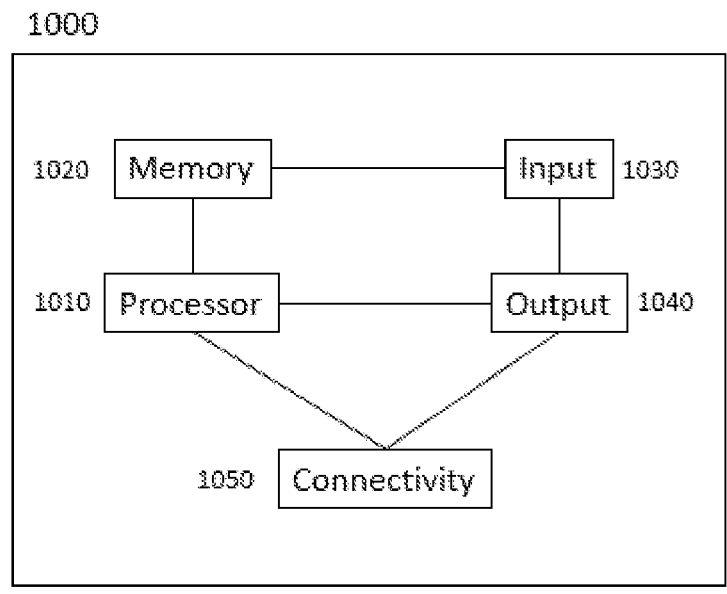
FIGS. 10 and 11 illustrate apparatuses according to exemplary embodiments.

FIG. 10 illustrates an apparatus 1000, which may be an apparatus such as, or comprised in, a terminal device, according to an exemplary embodiment. The apparatus 1000 comprises a processor 1010. The processor 1010 interprets computer program instructions and processes data. The processor 1010 may comprise one or more programmable processors. The processor 1010 may comprise programmable hardware with embedded firmware and may, alternatively or additionally, comprise one or more application specific integrated circuits, ASICs.

The processor 1010 is coupled to a memory 1020. The processor is configured to read and write data to and from the memory 1020. The memory 1020 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 1020 stores computer readable instructions that are executed by the processor 1010. For example, non-volatile memory stores the computer readable instructions and the processor 1010 executes the instructions using volatile memory for temporary storage of data and/or instructions.

The computer readable instructions may have been pre-stored to the memory 1020 or, alternatively or additionally, they may be received, by the apparatus, via an electromagnetic carrier signal and/or may be copied from a physical entity such as a computer program product. Execution of the computer readable instructions causes the apparatus 1000 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 1000 may further comprise, or be connected to, an input unit 1030. The input unit 1030 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1030 may comprise an interface to which external devices may connect to.

The apparatus 1000 may also comprise an output unit 1040. The output unit may comprise or be connected to one or more displays capable of rendering visual content such as a light emitting diode, LED, display, a liquid crystal display, LCD and a liquid crystal on silicon, LCoS, display. The output unit 1040 may further comprise one or more audio outputs. The one or more audio outputs may be for example loudspeakers.

The apparatus 1000 further comprises a connectivity unit 1050. The connectivity unit 1050 enables wireless connectivity to one or more external devices. The connectivity unit 1050 comprises at least one transmitter and at least one receiver that may be integrated to the apparatus 1000 or that the apparatus 1000 may be connected to. The at least one transmitter comprises at least one transmission antenna, and the at least one receiver comprises at least one receiving antenna. The connectivity unit 1050 may comprise an integrated circuit or a set of integrated circuits that provide the wireless communication capability for the apparatus 1000. Alternatively, the wireless connectivity may be a hardwired application specific integrated circuit, ASIC. The connectivity unit 1050 may comprise one or more components such as a power amplifier, digital front end, DFE, analog-to-digital converter, ADC, digital-to-analog converter, DAC, frequency converter, (de)modulator, and/or encoder/decoder circuitries, controlled by the corresponding controlling units.

It is to be noted that the apparatus 1000 may further comprise various components not illustrated in FIG. 10. The various components may be hardware components and/or software components.

Figure 11:
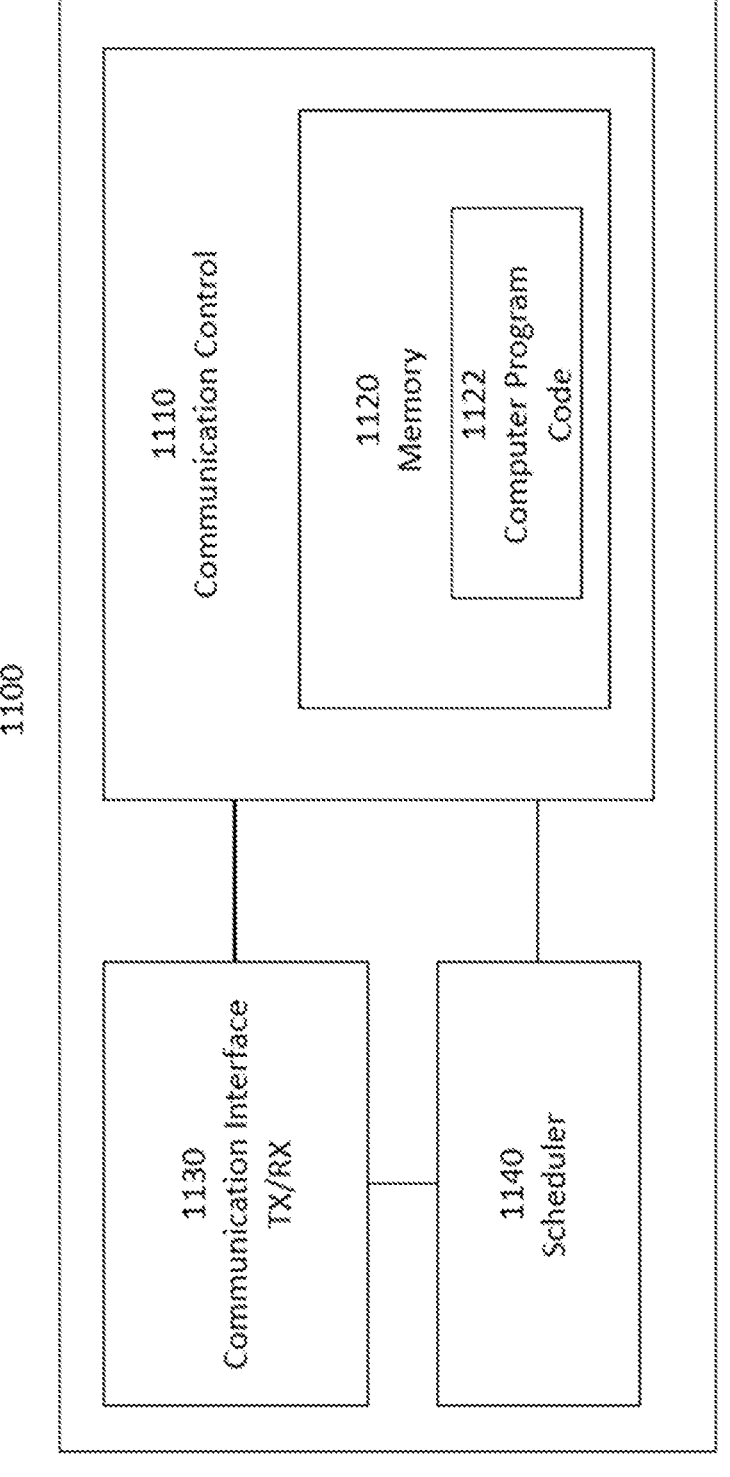

The apparatus 1100 of FIG. 11 illustrates an exemplary embodiment of an apparatus such as, or comprised in, a base station such as a gNB. The apparatus may comprise, for example, a circuitry or a chipset applicable to a base station to realize some of the described exemplary embodiments. The apparatus 1100 may be an electronic device comprising one or more electronic circuitries. The apparatus 1100 may comprise a communication control circuitry 1110 such as at least one processor, and at least one memory 1120 including a computer program code (software) 1122 wherein the at least one memory and the computer program code (software) 1122 are configured, with the at least one processor, to cause the apparatus 1100 to carry out some of the exemplary embodiments described above.

The memory 1120 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store a current neighbour cell list, and, in some exemplary embodiments, structures of the frames used in the detected neighbour cells.

The apparatus 1100 may further comprise a communication interface 1130 comprising hardware and/or software for realizing communication connectivity according to one or more communication protocols. The communication interface 1130 may provide the apparatus with radio communication capabilities to communicate in the cellular communication system. The communication interface may, for example, provide a radio interface to terminal devices. The apparatus 1100 may further comprise another interface towards a core network such as the network coordinator apparatus and/or to the access nodes of the cellular communication system. The apparatus 1100 may further comprise a scheduler 1140 that is configured to allocate resources.

As used in this application, the term "circuitry" may refer to one or more or all of the following:

a. hardware-only circuit implementations (such as implementations in only analog and/or digital circuitry) and b. combinations of hardware circuits and software, such as (as applicable):

i. a combination of analog and/or digital hardware circuit(s) with software/firmware and ii. any portions of hardware processor(s) with software (including digital signal processor(s)), software, and memory(ies) that work together to cause an apparatus, such as a mobile phone, to perform various functions) and c. hardware circuit(s) and or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus comprising at least one processor, and at least one memory including computer program code, wherein the at least one memory and the computer program code are configured, with the at least one processor, to cause the apparatus to:
   transmit, by a first distributed unit comprised in the apparatus, a beam switch request to a second distributed unit, wherein the beam switch request indicates a request to reserve a first set of resources of the second distributed unit for a terminal device, and a request for transmitting a beam switch command from the second distributed unit to the first distributed unit, wherein the beam switch command comprises at least an indication to trigger switching the terminal device from a first beam to a second beam;
   receive, by the first distributed unit, a beam switch acknowledgment from the second distributed unit, wherein the beam switch acknowledgment comprises at least the beam switch command;
   transmit, by the first distributed unit, a beam switch notification to a central unit, wherein the beam switch notification indicates a preparation for switching the terminal device from the first beam to the second beam, and wherein the first distributed unit and the second distributed unit are at least partly controlled by the central unit;
   transmit, by the first distributed unit, the beam switch command to the terminal device;
   receive, by the first distributed unit, a resource release message from the second distributed unit, wherein the resource release message indicates successful switching from the first beam to the second beam; and
   release, by the first distributed unit, upon receiving the resource release message, a second set of resources reserved for the terminal device at the first distributed unit.

2. An apparatus according to claim 1, wherein the beam switch command further comprises an index indicating a set of configuration parameters to be applied at the terminal device to actuate a beam switch from the first beam to the second beam.

3. An apparatus according to claim 1, wherein the first beam is associated with the first distributed unit, and the second beam is associated with the second distributed unit.

4. An apparatus according to claim 1, wherein the at least one memory and the computer program code are configured, with the at least one processor, to cause the apparatus to:
   receive, by the first distributed unit, information associated with the second beam from the central unit; and identify, by the first distributed unit, the second distributed unit based at least partly on the information associated with the second beam.

5. An apparatus according to claim 1, wherein the at least one memory and the computer program code are configured, with the at least one processor, to cause the apparatus to forward downlink user data from the central unit to the second distributed unit via the first distributed unit.

6. An apparatus comprising at least one processor, and at least one memory including computer program code, wherein the at least one memory and the computer program code are configured, with the at least one processor, to cause the apparatus to:
   receive, by a second distributed unit comprised in the apparatus, a beam switch request from a first distributed unit, wherein the beam switch request indicates a request to reserve a first set of resources of the second distributed unit for a terminal device, and a request for transmitting a beam switch command from the second distributed unit to the first distributed unit, wherein the beam switch command comprises at least an indication to trigger switching the terminal device from a first beam to a second beam;
   reserve, by the second distributed unit, the first set of resources for the terminal device as indicated by the beam switch request;
   transmit, by the second distributed unit, a beam switch acknowledgment to the first distributed unit, wherein the beam switch acknowledgment comprises at least the beam switch command;
   receive, by the second distributed unit, an acknowledgement from the terminal device via the second beam, wherein the acknowledgement indicates successful switching from the first beam to the second beam; and
   transmit, by the second distributed unit, a resource release message to the first distributed unit, wherein the resource release message indicates successful switching from the first beam to the second beam.

7. An apparatus according to claim 6, wherein the first distributed unit and the second distributed unit are connected via a Dn interface.

8. An apparatus comprising at least one processor, and at least one memory including computer program code, wherein the at least one memory and the computer program code are configured, with the at least one processor, to cause the apparatus to:
   determine, by a distributed unit comprised in the apparatus, a second beam based at least partly on one or more signal quality measurements;
   reserve a set of resources of the distributed unit for switching a terminal device from a first beam to the second beam;
   transmit a beam switch command from the distributed unit to the terminal device, wherein the beam switch command comprises at least an indication to trigger switching the terminal device from the first beam to the second beam;
   adjust one or more downlink tunnel endpoint identifiers of the distributed unit; and
   transmit a beam switch notification from the distributed unit to a central unit, wherein the beam switch notification indicates a preparation for switching the terminal device from the first beam to the second beam, wherein the first beam and the second beam are associated with the distributed unit.

* * * * *